US009010493B2

(12) United States Patent
Jagdale et al.

(10) Patent No.: US 9,010,493 B2
(45) Date of Patent: Apr. 21, 2015

(54) LUBRICATION ARRANGEMENT

(75) Inventors: Rakesh Jagdale, Waco, TX (US);
Lauritz Pillers, McGregor, TX (US)

(73) Assignee: Caterpillar Inc., Peoria, IL (US)

( * ) Notice: Subject to any disclaimer, the term of this patent is extended or adjusted under 35 U.S.C. 154(b) by 387 days.

(21) Appl. No.: 13/419,386

(22) Filed: Mar. 13, 2012

(65) Prior Publication Data
US 2013/0240299 A1 Sep. 19, 2013

(51) Int. Cl.
*F01M 1/02* (2006.01)
*F16N 7/38* (2006.01)
*B23Q 11/12* (2006.01)
*B23P 11/00* (2006.01)
*F01M 11/00* (2006.01)
*F16N 13/16* (2006.01)

(52) U.S. Cl.
CPC . *F16N 13/16* (2013.01); *F16N 7/38* (2013.01)

(58) Field of Classification Search
CPC ..... B23Q 11/123; B23Q 11/121; B23Q 11/10
USPC ................................. 184/6.14, 50.1
See application file for complete search history.

(56) References Cited

U.S. PATENT DOCUMENTS

| 1,629,730 | A | 5/1927 | Penberthy |
| 1,849,819 | A | 2/1932 | Smith, Jr. |
| 1,971,772 | A | 8/1934 | Curtis |
| 1,968,901 | A | 10/1934 | Neil |
| 2,827,860 | A | 3/1958 | Roberts |
| 2,869,374 | A | 1/1959 | Morris |
| 3,040,835 | A | 6/1962 | Ahnert |
| 3,129,788 | A | 4/1964 | Heckt |
| 3,193,028 | A | 7/1965 | Radizimovsky |
| 3,487,892 | A | 1/1970 | Kiefer |
| 3,490,549 | A | 1/1970 | Catterson |
| 3,587,782 | A | 6/1971 | Russell et al. |
| 3,595,342 | A | 7/1971 | O'Leary |
| 3,661,216 | A | 5/1972 | Yamanaka |
| 3,664,462 | A | 5/1972 | Smith, Sr. |
| 3,749,186 | A | 7/1973 | Kutuzov et al. |
| 3,774,700 | A | 11/1973 | Shepherd |
| 3,966,019 | A | 6/1976 | Heikkila et al. |
| 4,149,602 | A | 4/1979 | James |
| 4,157,121 | A | 6/1979 | Amtsberg et al. |
| 4,190,116 | A | 2/1980 | O'Neal et al. |
| 4,289,209 | A | 9/1981 | Salmi |
| 4,333,538 | A | 6/1982 | Ekwall |
| 4,474,248 | A | 10/1984 | Musso |
| 4,598,796 | A | 7/1986 | Barrows |

(Continued)

FOREIGN PATENT DOCUMENTS

| EP | 0486752 A1 | 4/1991 |
| EP | 0593839 A1 | 4/1994 |

(Continued)

*Primary Examiner* — William E Dondero
*Assistant Examiner* — Mark K Buse
(74) *Attorney, Agent, or Firm* — BakerHostetler

(57) ABSTRACT

A lubrication system for a work tool, such as a demolition hammer, on a machine, such as an excavator or a loader. The lubrication system is mounted on drive line fluid connectors of the machine, such as hydraulic or pneumatic hoses. The lubrication system is fully supported by the connectors only and does not require mounting to the machine itself. The lubrication system includes a movable spool powered by the drive fluid of the machine, the spool reciprocating within a sleeve to force lubricant through passages to the work tool.

20 Claims, 5 Drawing Sheets

(56) References Cited

U.S. PATENT DOCUMENTS

| | | | |
|---|---|---|---|
| 4,793,719 A | 12/1988 | Crockett et al. | |
| 5,060,761 A | * 10/1991 | Arndt et al. | 184/6.14 |
| 5,293,959 A | 3/1994 | Kimberlin | |
| 5,351,763 A | 10/1994 | Muuttonen | |
| 5,385,209 A | 1/1995 | Bodell et al. | |
| 5,549,031 A | 8/1996 | Giordano | |
| 5,562,170 A | 10/1996 | Wolfer et al. | |
| 5,653,295 A | 8/1997 | Juvonen et al. | |
| 6,070,678 A | 6/2000 | Pascale | |
| 6,116,301 A | 9/2000 | Deimel et al. | |
| 6,145,625 A | * 11/2000 | Prokop et al. | 184/27.1 |
| 6,273,199 B1 | 8/2001 | Kiiikka et al. | |
| 6,405,810 B1 | 6/2002 | Grach et al. | |
| 6,510,904 B1 | 1/2003 | Tyrrell | |
| 6,631,787 B2 | 10/2003 | Conley et al. | |
| 6,929,098 B2 | * 8/2005 | Ilmarinen et al. | 184/50.1 |
| 7,694,748 B2 | * 4/2010 | Oksman | 173/77 |
| 2006/0048957 A1 | 3/2006 | Oksman | |
| 2006/0243528 A1 | 11/2006 | Bukhari et al. | |
| 2007/0187181 A1 | 8/2007 | Brendel | |
| 2009/0277657 A1 | 11/2009 | Berger et al. | |
| 2012/0043163 A1 | * 2/2012 | Jagdale et al. | 184/6.4 |

FOREIGN PATENT DOCUMENTS

| | | |
|---|---|---|
| EP | 0935090 A1 | 8/1999 |
| EP | 1112820 A2 | 7/2001 |
| EP | 1321245 A1 | 6/2003 |
| JP | 57190894 A2 | 11/1982 |
| JP | 2003/340747 A | 12/2003 |
| WO | 0233309 A1 | 4/2002 |
| WO | 03053639 A1 | 7/2003 |

* cited by examiner

LUBRICATION ARRANGEMENT

TECHNICAL FIELD

This disclosure relates to a lubrication system for a work tool, and more particularly to a lubrication system for a hydraulic or pneumatic work tool of a machine. This disclosure also relates to a method of lubricating the work tool.

BACKGROUND

Demolition hammers are used on work sites to break up objects such as rocks, concrete, asphalt, frozen ground, or other hard objects. The hammers may be mounted to machines, such as backhoe loaders, skid steer loaders and excavators, or may be hand-held. The hammers may be powered by a hydraulic or pneumatic pressure source. In one example of an operation, a high pressure fluid drives a piston to strike a tool bit, which in turn, strikes rock, concrete, asphalt or other hard object to be broken up.

Lubrication systems are used to supply lubricant, such as grease, to bearing surfaces in the hammer to reduce friction between moving parts, such as between the tool bit and bushings that are used to align the tool bit. The lubrication system may be mounted to the hammer, i.e., mounted on the work tool. A lubricant supply is provided with the system. Operating the hammers without lubrication can result in significant damage to the hammer.

U.S. Pat. No. 7,694,748, to Oksman, describes a lubrication system for work tools, such as hammers and drills. The lubrication system is mounted on the tool itself in order to be closer to the points requiring lubrication. This patent describes work tools that generate impact pulses to break rocks and drill into rocks, in a manner similar to other construction machines.

The '748 patent provides lubricant and a lubrication system that is close to the points requiring lubrication on the work tool. However, the impact pulses that are used in the normal course of operating the machines also have an effect on the operation of the lubrication system. The constant vibration and the repetitive nature of the method of operation can adversely affect operation of the lubrication system. The vibrations reduce the life of the hoses used to provide hydraulic or pneumatic fluid to power the lubrication system. The vibrations can also loosen or weaken the connections with the fluid power lines and the lubricant lines, which could result in loss of lubrication to the work tool. In addition, the lubrication system, mounted on the tool itself, may be damaged if the tool is moved into and maneuvered within a confined space, such as a trench.

SUMMARY

In one aspect, the present disclosure is directed to a method for distributing lubricant to one or more components of a work tool. The method includes steps of mounting a lubrication assembly on at least one hydraulic or pneumatic hose of a work tool driven by a drive fluid and connecting an outlet for lubricant from the lubrication assembly to the work tool driven by the drive fluid, wherein in response to operation of the work tool by the drive fluid, the lubricant is provided from the lubrication assembly to the work tool.

In one aspect, the present disclosure is directed to a lubrication assembly. The lubrication assembly includes a housing for mounting on at least one drive fluid line or return fluid line of a work tool, the housing adapted for mounting a lubricant reservoir, the housing defining a space in communication with a passage in the housing for supplying a lubricant from the lubricant reservoir, a spool disposed within the space, the spool adapted to move between a first position and a second position within the space in response to fluid pressure of a drive fluid, and a lubricant pumping mechanism operable by movement of the spool between the first position and the second position within the space to displace the lubricant from the lubricant reservoir.

In some embodiments, the lubrication system is intended for lubricating a work tool of a pneumatic or hydraulic machine. The lubrication system includes a work tool adapted for a hydraulic or pneumatic machine, a housing mounted on a drive fluid line or return fluid line for the work tool, the housing adapted for mounting a reservoir of lubricant, the housing defining a space, a volume of the space adapted to be varied by adjusting a position of a cap of the housing, a spool disposed at least partially within the space, the spool adapted to move between a first position and a second position in response to fluid pressure of a drive fluid, and a lubricant pumping mechanism operable by movement of the spool between the first position and the second position to provide a lubricant from the lubricant reservoir to the work tool.

Various embodiments of the present disclosure may contain only a subset of the elements and advantages set forth. No one advantage is critical to the embodiments. Any claimed embodiment may be technically combined with any other claimed embodiment(s).

BRIEF DESCRIPTION OF THE DRAWINGS

In the accompanying drawings, which are incorporated in and constitute a part of this specification, exemplary embodiments of the disclosure are illustrated, which, together with the written description, serve to explain the principles of the disclosed system.

DETAILED DESCRIPTION

A lubrication method and system for a work tool on a machine, such as a construction machine are disclosed. The lubrication system is mounted on drive line fluid connectors of the machine. The lubrication system is fully supported by the connectors and does not require mounting to the machine itself.

Figure 1:
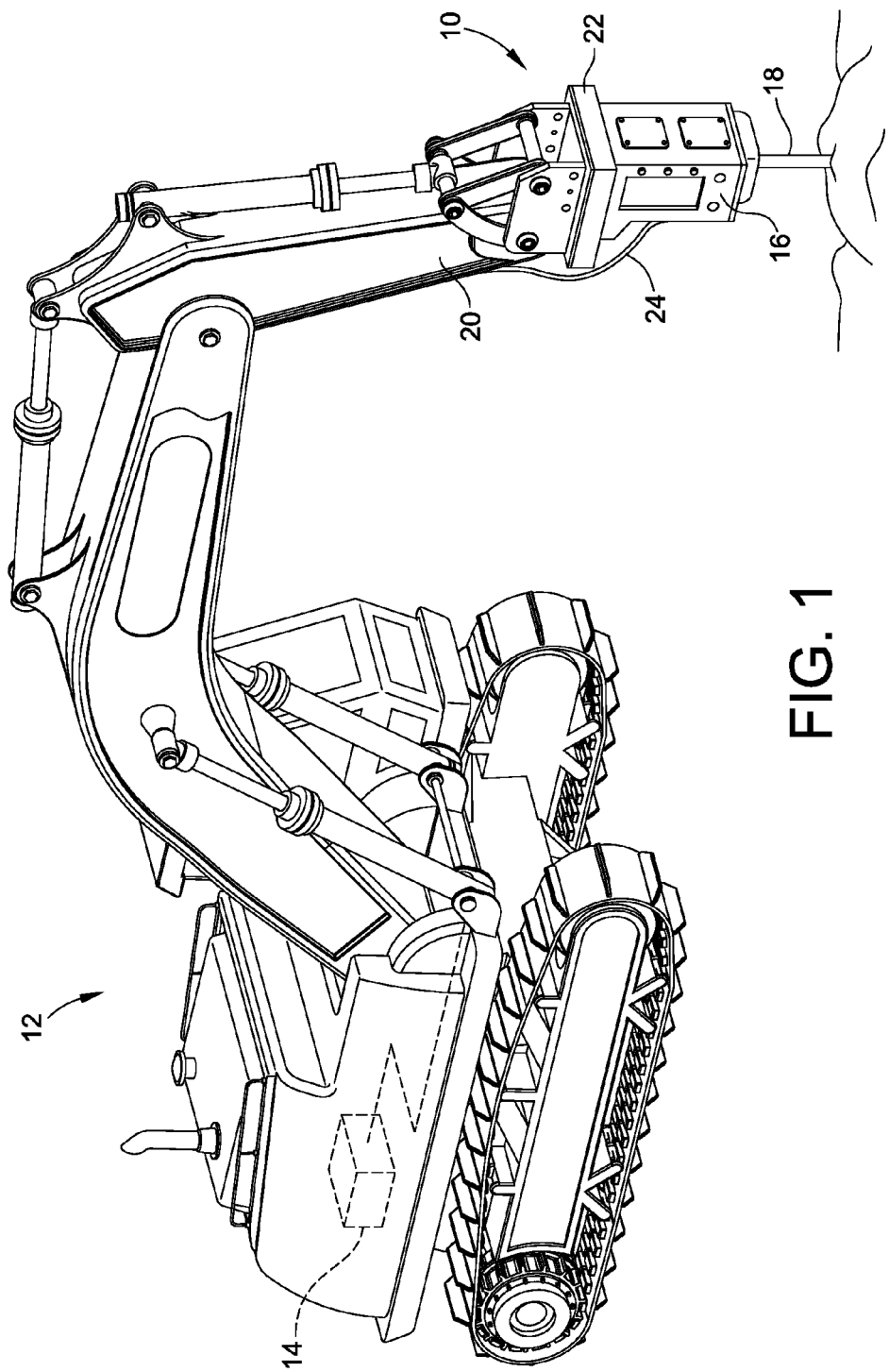
FIG. 1 is a schematic view of an embodiment of a work tool attached to an excavator.

Referring to FIG. 1, a work tool 10 powered by a drive fluid is attached to a boom 20 of an excavator 12. The work tool 10, however, may be connected to any suitable machine or base. In the depicted embodiment, the work tool 10 is a hydraulic or pneumatic powered breaking tool, such as a demolition hammer. When attached to the excavator 12, as illustrated, the excavator's hydraulic system 14 may be used to power the tool. Thus, the drive fluid may be hydraulic fluid. The present disclosure, however, is applicable to other hydraulic or pneumatic tools and to tools powered by other means. The work tool 10 includes a power cell 16 and a tool 18. The power cell 16 is configured to provide a breaking force via the tool 18 to an object, such as rocks, concrete, asphalt, frozen ground, or other hard objects. A lubrication system 22 according to the present disclosure is mounted on hydraulic or pneumatic hoses 24 that are used to power the work tool 10.

Figure 2:
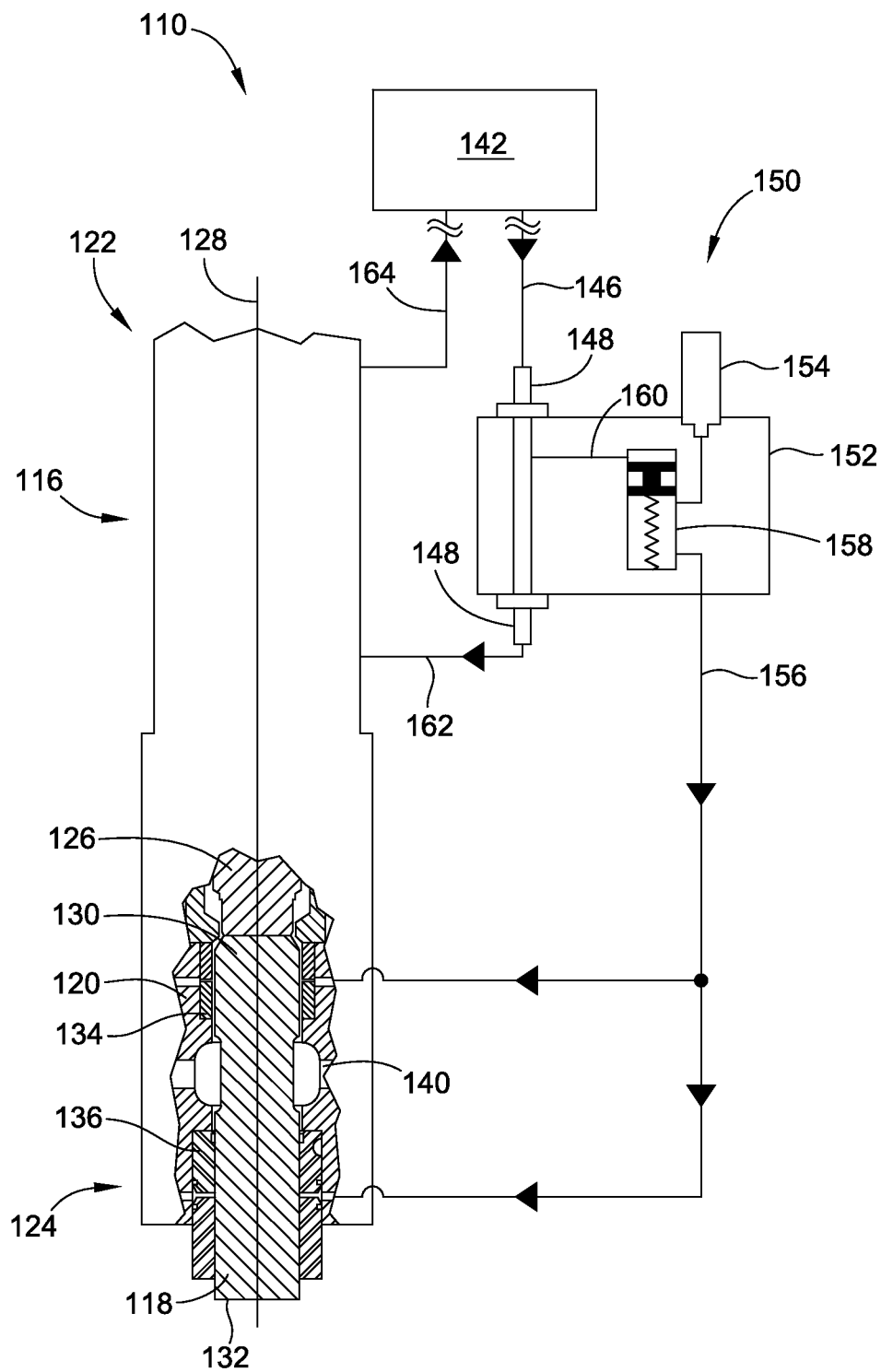
FIG. 2 is a schematic and cross-sectional view of an embodiment of a work tool provided with a hose-mounted lubricating system according to the present disclosure.

FIG. 2 is a schematic illustration of an embodiment of a work tool 110 powered by a drive fluid according the present disclosure. The work tool is illustrated as a demolition hammer 110, such as a hydraulic hammer. The hammer 110 includes a power cell 116 and a tool 118. The power cell 116 includes a housing 120 having an upper end 122 and a lower end 124. The housing 120 may be formed as a single piece or may consist of a plurality of pieces and may be configured in a variety of ways. A piston 126 is disposed within the housing 120 and is movable along an axis 128. The tool 118 is also disposed within the housing 120 and is movable along the axis 128. The tool 118 includes a first end 130 and a second end 132. The first end 130 is configured and positioned in the housing to be struck by the piston 126. The second end 132 of the tool 118 extends from the lower end 124 of the housing 120 to be engaged with objects to be broken.

The power cell 116 may also include an upper bushing 134 and a lower bushing 136. The upper bushing 134 and the lower bushing 136 are fixably held within the housing 120 by cross pins or other suitable means. The tool 118 is slideably received with the upper bushing 134 and the lower bushing 136. The tool 118 is retained within the housing 120 by retaining pins 140 or other suitable retention devices.

A drive fluid source 142 may be associated with the hammer 110. The drive fluid source 142 may be configured to, on demand, deliver pressurized drive fluid to the hammer for use in driving the piston 126. A pressure source, such as a fluid pump 14, from FIG. 1, or other suitable pressure source may be associated with the drive fluid source 142 to pressurize the drive fluid. The drive fluid source 142 may be in fluid communication with a fluid inlet on the hammer 110 via a fluid passage 162 and with a fluid return passage 164.

A lubrication system 150 is associated with the excavator 12 and is used to lubricate the tool of work tool hammer 110. The lubrication system 150 includes a housing 152 in fluid communication with a lubricant reservoir 154. Any suitable lubricant may be used, such as grease, for example. The lubrication system 150 is in fluid communication with the power cell 116 via a lubrication passage 156. The lubrication passage 156 communicates lubricant to each of the upper bushing 134 and the lower bushing 136. For ease of illustration, a portion of lubrication passage 156 is illustrated external to housing 120, though in some embodiments, the lubrication passage 156 may consist of internally formed conduits in the housing 152.

The lubrication system 150 receives drive fluid through drive fluid passage 146 which may be routed to a pressure regulator before the drive fluid enters lubrication system housing 150 via drive fluid inlet passage 160. Within housing 152, the drive fluid provides motive power for the spool and sleeve 158, embodiments of which are described below in greater detail. The lubrication system 150 is mounted on drive fluid line connectors 148, one connector for receiving fluid from the fluid source 142 and the other for transmitting the fluid to the work tool 110 via passage 162. While the drive fluid source is shown as an input to the lubrication system 150, the return line may also be used to power the lubrication system. The pressure differentials induced in either the input line or the return line are sufficient for operation of the lubrication system.

The connectors may be conventional connectors suitable for high-pressure hydraulic or pneumatic fluids. Alternatively, the connectors may be quick-disconnect type connectors, such as male and female connectors that fit together and disconnect very quickly. These connectors tend to be substantial, capable of handling the very high pressures used to operate pneumatic or hydraulic hammers, drills and other tools.

Figure 3:
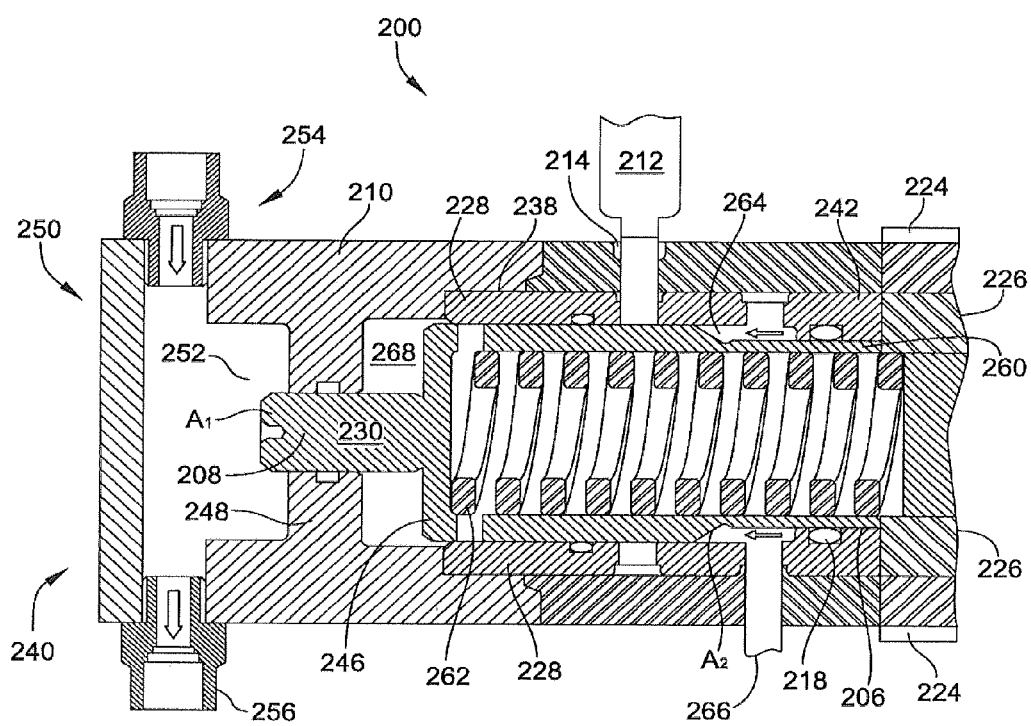
FIG. 3 is a partial cross-section view of an embodiment of a lubricating system.
Figure 4:
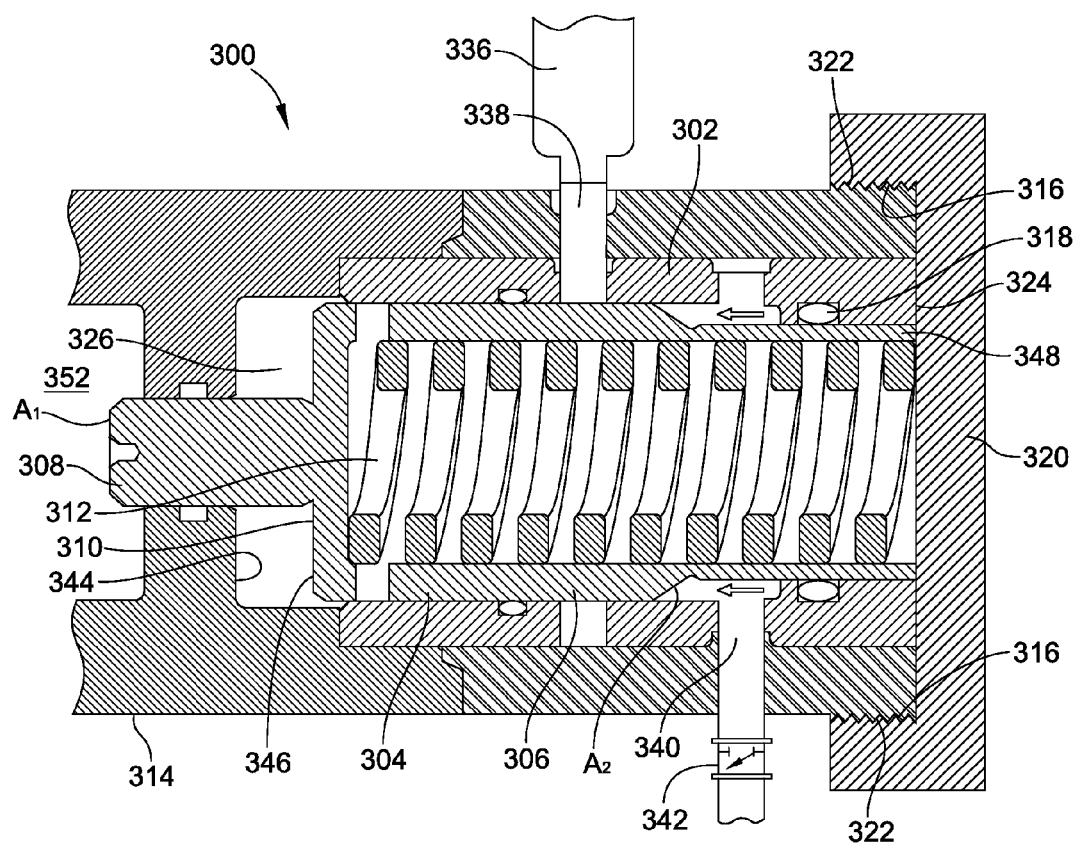
FIG. 4 is a magnified cross section view of a portion of an alternate lubricating system according to the present disclosure.
Figure 5:
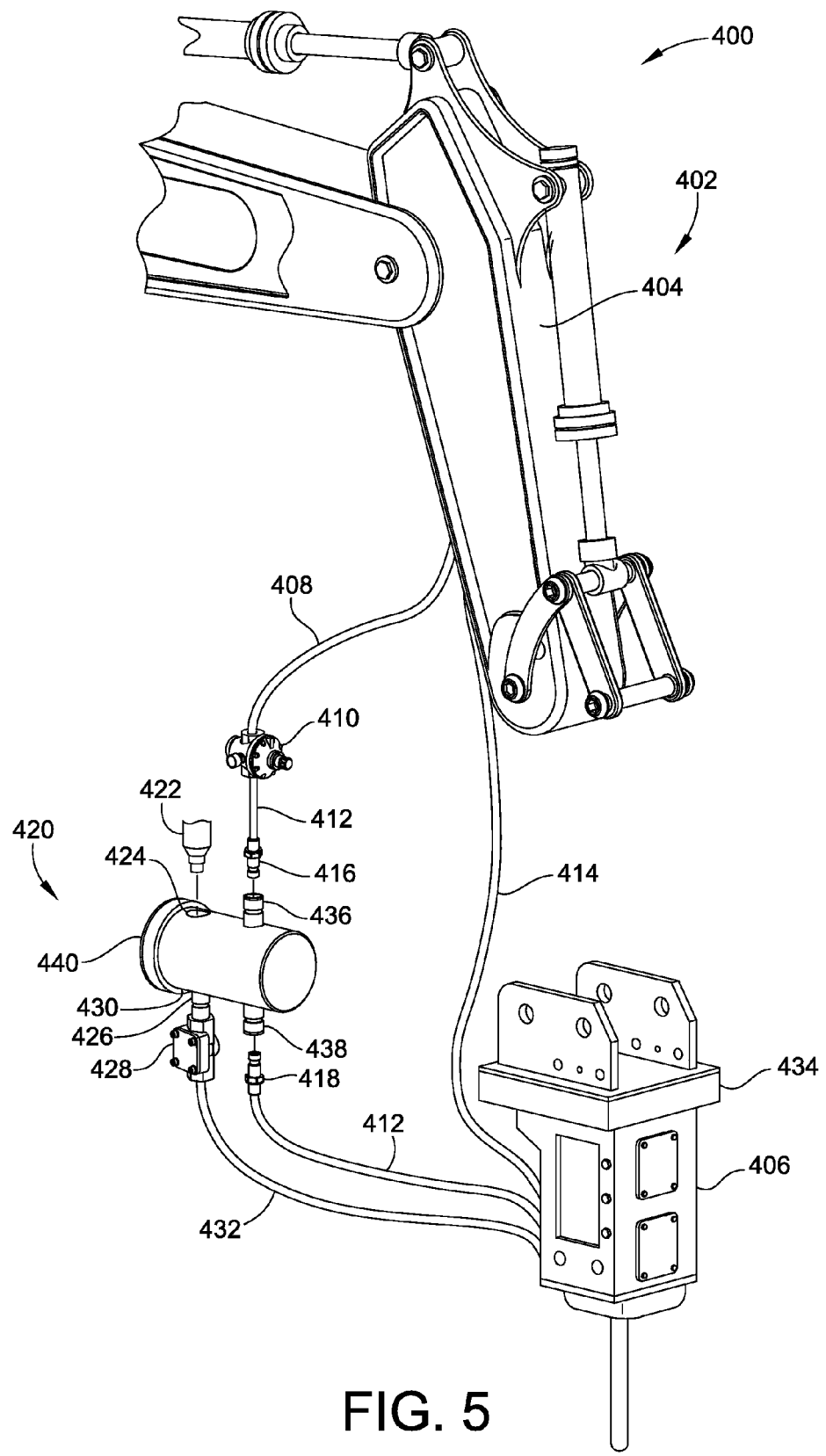
FIG. 5 is an exploded view of an alternate embodiment of a lubrication system according to the present disclosure.

FIGS. 3-5 illustrate embodiments of lubrication systems for a work tool powered by a drive fluid of the present disclosure. In. FIG. 3, a lubrication system 200 includes a housing 210 and a lubricant reservoir 212, such as a grease cartridge. The lubricant reservoir 212 in the depicted embodiment is a grease cartridge, though other suitable lubricants can be used. Other embodiments may have more than one reservoir; the reservoir may be a pressurized source of lubricant. The housing 210 receives the lubricant reservoir 212 in a recess 214 in the upper portion of the housing. The recess 214 includes seats for various a seal (not shown), which prevents lubricant from the reservoir 212 from leaking out of the top of the recess 214. The housing 210 mounts to the hydraulic or pneumatic hoses via connectors in the inlet port 250 and outlet port 240 of the housing 210. In one example, push-to-connect quick disconnectors may be used, such as female inlet quick disconnects 256. Male quick disconnects, or a combination, could be used instead. These connectors are intended for mating with matching quick disconnects on the hydraulic or pneumatic hoses near the boom and supplying drive fluid to the work tool or returning the drive fluid from the work tool.

Lubrication system 200 includes a stationary sleeve 228 secured by a cap 224 which is fastened to the housing 210. Sleeve 228 has a first end 238 and a second end 242, the sleeve being mounted in internal cavity 268 of the housing. The housing 210 is configured to mount to the pressurized hydraulic lines to form an on-board or integrated lubricant system with work tool of the hydraulic or pneumatic machine, such as an excavator or backhoe loader. Plug 226 is held in place by cap 224 to secure the sleeve in place. Within the sleeve is a moveable spool 230, the spool having a cylindrical portion 206 and a projection portion 208, the spool also having a first end 246 on the left and a second end 260 on the right. Projection portion 208 protrudes through a dividing wall 248 within housing 210. Dividing wall 210 isolates the force of pressurized fluid from the fluid passage 252 from the remainder of the internal portions of the lubrication system.

The internal portion of the lubrication system exposed to the force of the pressurized fluid is the area A1 on the projection portion 208 of the spool 230. When the pressurized fluid pulses, the force of the fluid overcomes the force of spring 262, forcing the spool 230 and the spring 262 to the right in FIG. 3. Grease which has been held in chamber 264 is swept out through grease outlet 266 by the force applied from area A2 of spool 230. When the pressurized fluid is at a lower pressure after a pulsation of high force, the force of spring 262 is able to overcome the pressure and the spring expands to the left in FIG. 3, forcing spool 230 to the left. Spring 262 may be a torsion spring or other suitable spring. Spring 262 is grounded between the plug 226 on the right side, which plug is fixed in position. The spring 262 is grounded on an inside surface of the spool 230. Accordingly, spring 262 assists the movement of the spool in a reciprocating motion, left and right and right to left, to draw lubricant in during leftward movement and to pump lubricant out during rightward movement.

When spool 230 moves to the left, lubricant from the lubricant reservoir 212 and passage 214 enters lubricant chamber 264. Seal 218 may assist in retaining the lubricant in the lubricant chamber. In the depicted embodiment, the first contact surface area A1 is greater than the second contact surface area A2. In one embodiment, the ratio of first contact surface area A1 to second contact surface area A2 is approximately 2.2:1 to approximately 1.8:1. In another embodiment, the ratio of first contact surface area A1 to second contact surface area A2 is approximately 2:1.

Another embodiment is disclosed in FIG. 4. Lubrication system 300 has many of the features and similar parts to the system disclosed in FIG. 3. FIG. 4 focuses more on the right-hand portion of the lubrication system, with the left-hand portion with pressurized fluid in and out portions being similar. In this embodiment, cap 320 is secured to the housing 314 with screw-type threads, thus allowing internal cavity or hollow passage 326 to have a variable length, rather than the fixed length of internal cavity 268 of the housing 214 in FIG. 3. Operation of lubrication system 300 is similar to that of the embodiments described above. The system includes moveable spool 304 with a cylindrical portion 306 and projection portion 308. Pressurized fluid enters fluid passage 352 and acts on area A1 of the spool. This forces spool 304 to the right in FIG. 4. Movement is resisted by spring 312, which is grounded between internal surface 310 of spool 304, and internal surface 324 of the cap 320. In FIG. 4, internal cavity or hollow passage 326 in housing 314 is shorter in length than spool 304, as compared to similar parts in FIG. 3. In FIG. 4, the spool has been forced almost all the way to the right, with little space remaining on the left between the left engagement surface 310 of the spool and the left-most end of internal cavity or hollow passage 326.

In this embodiment, cap 320 is secured to housing 314 with screw threads 322 of the cap secured to screw threads 316 of the housing. The position of the cap with respect to the housing may be adjusted by tightening or loosening the cap. This is accomplished by simply turning the cap using the greater or lesser engagement of the threads. The embodiment of FIG. 4 also includes a fixed sleeve 302, lubricant inlet 338, seal 318, lubricant outlet 340, and area A2 as previously discussed. Lubricant system 300 includes a check valve 342 to prevent backward flow of lubricant in the upward direction of FIG. 4, rather than the intended downward direction to a tool bit or other device requiring lubrication. Lubricant may be supplied as a tube 336 of lubricant, or in any other convenient form. The lubrication may be furnished as a pressurized source of lubricant. In addition, the lubricant outlet 340 may also connect to the work tool by means for connecting, e.g., a valve, such as a ball valve, or quick disconnect couplings. These may include push-to-connect quick disconnects or thread-to-connect couplings.

Another embodiment of the disclosure is depicted in FIG. 5. In this embodiment, lubrication system 400 is intended for mounting on hydraulic lines 402. A machine (not shown) includes a boom 404 supporting hydraulic supply line 408 for hammer 406 and return line 414 from the hammer. Supply line 408 connects to a pressure regulator 410 for regulating a delivered pressure to hammer 406. The pressure regulator routes hydraulic fluid with regulated pressure through hydraulic line 408 to a lubrication system 420 through hydraulic line quick disconnect inlet connector 416. Lubrication system 420 is similar to those described in above in the embodiments of FIGS. 3-5.

This embodiment includes a housing 430 mounted to hydraulic lines 412 through hydraulic line quick disconnect outlet connector 418 to hammer 406. Housing 430 may include fluid connectors 436, 438 for respectively connecting to fluid input and output lines connectors 416, 418. The housing includes a connector or inlet 424 for lubricant, for which a source 422 of lubricant may be supplied. Lubricant is pumped out through lubricant outlet connector 426 through lubricant line 432 to the lubricant connector 434 on hammer 406. The outlet includes a check valve 428 to prevent backflow of lubricant into housing 430. In one embodiment, the connectors may be quick-disconnects. The system includes a cap 440 which may be threadably connected to the housing 430. The cap may act as a grease stroke adjustment mechanism.

INDUSTRIAL APPLICABILITY

In use, the hammer lubrication system may be mounted on and connected by quick-disconnect coupling connectors, for example, to a hammer 10, as shown in FIG. 1. In the depicted embodiment, the lubrication system 22 is mounted directly to the pressurized hydraulic lines connected to the hammer rather than on the hammer or on the construction machine itself, so the lubrication system may travel with the hammer even if the hammer is moved from the machine.

Embodiments of the lubrication system as disclosed above may be useful for all types of pneumatic and hydraulic machines with work tools as discussed. Construction machines may include excavators, backhoe loaders and skid steer loaders, for example. There are advantages to the lubrication system in that it is not directly mounted on the work tool and thus is not subjected directly to the shock and vibration of, for example, an impact hammer. This may be particularly advantageous in the case of smaller work tools which work at a faster frequency than larger work tools. Smaller work tools use smaller hammers, bits or drills and thus require a smaller volume of lubricant.

Thus, in some embodiments, the lubrication system may only weigh 1-2 kilograms and is easily mounted to the hydraulic or pneumatic hoses of a hydraulic or pneumatic machine. The housing for such a system may occupy a space as small as about 6"×6"×2" (about 15 cm×15 cm×5 cm). Connectors, such as quick-disconnects for high-pressure hydraulic lines can tolerate very high pressures from the hydraulic fluid because the connectors themselves are quite sturdy. Thus, a small, lightweight lubrication system may be mounted directly on the connectors without direct support from the tool itself or the boom. This allows the work tool to have a close-by source of lubrication under the eye of the operator but without interference in the operation of the tool.

Such interference could occur when the tool is maneuvered into a ditch or into a deeper hole, where a protruding lubrication system could be knocked off the tool. A lubrication system as described herein may be tailor to fit within a vertical or horizontal profile of the tool, allowing the tool to be maneuvered without concern for the lubrication system. An example would be a lubrication system as disclosed herein that fits within a vertical profile of a hammer, or within a horizontal profile of a drill intended for use in a horizontal orientation. At least one further advantage of the relatively small, compact system is that even if the lubrication system is damaged, it can be quickly disconnected from the hydraulic or pneumatic hosing connections and replaced without replacement of the tool and without dismounting from the tool—because the lubrication system is not mounted on the tool.

In one embodiment, the lubricant system and work tool is interchangeable among hydraulic or pneumatic machine machines using such tools. For example, a first excavator may use a hammer to be lubricated by the lubrication system. On a different project or a different phase of a given project, the hammer and its lubrication system may be easily disconnected and moved to another machine. For example, with hydraulic machines, pressurized hydraulic lines are typically connected with quick-disconnect couplings, making disconnection from one tool and connection to another a very quick and easy project.

By mounting the lubrication system in this way, on the pressurized lines but not on the work tool itself, the lubrication system is not subjected directly to the severe vibrations and shocks experienced by the work tool. Rather, the pulsing of the drive fluid is put to work by the lubrication system to drive lubricant to the tool bit or other area requiring lubrication. In addition, by mounting the lubrication system on the hoses, the lubrication system is not subjected to direct impact in use. For example, when such machines work in trenches, maneuvering the work tool may result in striking the lubrication system against a trench wall, possibly damaging the system and interrupting the flow of lubricant.

In the embodiment of FIG. 2, the drive fluid source 142 is connected to the drive fluid inlet 146 which directs drive fluid to the drive fluid inlet 160 for the sleeve and spool 158. Thus, drive fluid is passed through the lubrication system 150 before being directed, via the drive fluid outlet 162, to act on the hammer piston 126. The lubricant is provided to the lubrication points through pre-existing lubricant ports/channels in the hammer. Therefore, at least some embodiments of the disclosure can be used with existing hammers without modification to the hammers.

With respect to the embodiment depicted in FIG. 3, after the hammer is activated, pressurized fluid enters through fluid inlet 250. This moves the spool 230 all the way to the right, to the position shown in FIG. 3, with the spring 262 urging the spool 230 against the cap 224 and plug 226. When the hammer is deactivated, pressurized drive fluid leaves through the drive fluid outlet 240. The drive fluid thus pulses and passes into the inlet 250, through the passage 252, and out of the drive fluid outlet 240 to be directed to act on the piston 126.

Drive fluid pressure in the passage 252 accomplishes this by acting on the projection 208 of the spool 230. When the spool 230 moves from the left to the right, as shown in FIG. 3, the volume of lubricant in lubricant charge chamber 264 decreases because some of the lubricant in the lubricant charge chamber 264 is forced through lubricant delivery passage 266 to bearing lubrication points on the hammer 110. The drive fluid pressure acting on projection 208 must create sufficient force to overcome the bias of the spring 262 and the pressure of the lubricant in the lubricant charge chamber 264 and lubricant delivery passages. Configuring the first contact surface area A1 to be greater than the second contact surface area A2, such as having the ratio of first contact surface area A1 to second contact surface area A2 be in the range of approximately 2.2:1 to approximately 1.8:1, allows for movement of the spool even when drive fluid pressure is much less than lubricant pressure.

As noted above, the embodiment of FIG. 3 has an internal cavity or passage 268 with a fixed volume and a fixed length. Thus, every movement of the spool from left to right and back will displace a fixed amount of lubricant from the lubricant source 212 through the lubricant outlet 266 and to the work tool or hammer. It may be advantageous to have the ability to vary the movement of the spool and thus to vary the volume of lubricant with each reciprocation of the spool. The embodiment of FIG. 4 has such a capability.

In the embodiment of FIG. 4, lubrication system 300 has an exaggeratedly short internal cavity or hollow passage 326. As seen in the right portion of this figure, the spool has less than a centimeter of travel remaining between contact between the right end 348 of the cylindrical portion 306 of the spool and the internal surface 324 of cap 320. On the left side, there are only a few millimeters of length or travel between left end of spool 346 and its engagement surface 310 before the spool contacts dividing wall 344. In FIG. 3, the corresponding portions of the figure depict about 1.5 cm on the left side, with no travel remaining on the right side. Thus, each stroke or reciprocation of the spool in the embodiment of FIG. 4 will be shorter than the corresponding spool of FIG. 3. For sleeves and spools of equal diameters, the lubrication system of FIG. 3 will pump a greater amount of lubricant than the embodiment of FIG. 4.

Another feature of the embodiment of FIG. 4 is the inclusion of a check valve 342 on the outlet of the lubrication system. Thus prevents backward flow of the lubricant. Backward flow may occur when the spool moves to the left in the sleeve. This movement tends to draw lubricant from the lubricant source or container 336, but it may also draw a small amount of lubricant from the outlet 340. By placing a small check valve near the outlet, such retrograde flow is prevented and lubricant will be drawn from the source. This allows the lubrication system to pump more lubricant toward the tool and thus increases the efficiency of the lubrication system.

In another embodiment, the lubrication system may include an additional passageway and connectors for a return line for the pneumatic or hydraulic fluid that powers the work tool. While these connectors are not strictly necessary for operation of the lubrication system or the work tool, the additional connectors may provide support for the lubrication system. The additional passageways need not be connected to any other passageway within the lubrication system, they are a simple in-and-out passage whose purpose is to use the bulky nature of the connectors to support the lubrication system. In another embodiment, the lubrication system may be mounted on the return line by another mechanical connection. Examples include a hose clamp or a wire tie, mechanical devices that will cause the return line to securely hold the lubrication system without causing chafing or wear on the hoses. These devices help to provide for mounting the lubrication system on one or more drive fluid lines.

The embodiments disclosed herein use the surfaces of the spool and the sleeve to act as pumping elements, both to pump lubricant into the lubrication system during activation of the tool and to draw new lubricant into the lubricant charge chamber during deactivation of the tool. Therefore, no additional pump is required for lubrication. The pumping action is activated by the drive fluid pressure, so no additional pumping power supply is needed.

While the disclosed embodiments have been illustrated and described in detail in the drawings and foregoing description, such illustrations and descriptions are to be considered as exemplary and not restrictive in character, it being understood that only certain exemplary embodiments have been shown and described and that all changes and modifications that come within the scope of the disclosure are desired to be protected. For example, in alternative embodiments, the bearing surfaces of the hammer may be lubricated upon deactivation of the hammer, instead of upon activation. In such embodiments, the lubricant charge chamber may be replenished whilst the hammer is being activated, instead of upon deactivation.

The disclosed embodiments are not limited to use with demolition hammers. Rather, they may be used with any work tool powered by a drive fluid where lubrication of surfaces of the work tool or tool bit is desired. In addition, other configurations of the lubrication system are possible, as will be apparent to those having skill in the art.

It will also be apparent to those skilled in the art that various modifications and variations can be made to the disclosed dosing system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method for distributing lubricant to one or more components of a work tool comprising:
    mounting a lubrication assembly in series with at least one hydraulic or pneumatic hose of a work tool driven by a drive fluid; and
    connecting an outlet for a lubricant from the lubrication assembly to the work tool driven by the drive fluid,
    wherein in response to operation of the work tool by the drive fluid, which is fed in series to the lubrication assembly, the lubricant is provided from the lubrication assembly to the work tool.

2. The method of claim 1, wherein the step of mounting comprises connecting an inlet and an outlet for a drive fluid of the machine to the lubrication system.

3. The method of claim 1, wherein lubricant is provided by distributed to the work tool via movement of a spool within a housing of the lubrication assembly.

4. The method of claim 3, further comprising adjusting a volume of lubricant provided per stroke of the spool.

5. The method of claim 1, further comprising regulating a pressure of the drive fluid to the lubrication assembly.

6. The method of claim 1, further comprising preventing backward flow of lubricant.

7. The method of claim 1, wherein the work tool is selected from a group consisting of a hydraulic work tool and a pneumatic work tool.

8. A lubrication assembly, comprising:
    a housing for mounting on at least one drive fluid line or return fluid line of a work tool, the housing adapted for mounting a lubricant reservoir;
    the housing defining a first space in communication with a passage in the housing for supplying a lubricant from the lubricant reservoir, and the housing defining a second space fluidly connected in series with the work tool via the at least one drive fluid line or return fluid line;
    a spool disposed within the first space, the spool adapted to move between a first position and a second position within the first space in response to a fluid pressure of a drive fluid in the second space; and
    a lubricant pumping mechanism operable by movement of the spool between the first position and the second position within the first space to displace the lubricant from the lubricant reservoir.

9. The lubrication assembly of claim 8, wherein the drive fluid is adapted to operate a hydraulic or pneumatic work tool.

10. The lubrication assembly of claim 9, wherein the lubrication assembly further includes a mechanism for preventing backflow of the lubricant.

11. The lubrication assembly of claim 8, wherein a volume of the first space is variable.

12. The lubrication assembly of claim 8, wherein the lubrication assembly further includes a pressure regulator for adjusting the fluid pressure of the drive fluid.

13. The lubrication assembly of claim 8, further including a spring biasing the spool and wherein a threshold pressure less than an operating pressure for a work tool of a hydraulic or pneumatic machine is required to overcome a force of the spring.

14. The lubrication assembly of claim 8, wherein the lubrication assembly is adapted to be interchangeable among a plurality of work tools.

15. A lubrication system for lubricating a work tool, the lubrication system comprising:
    a work tool adapted for a hydraulic or pneumatic machine;
    a housing mounted on a drive fluid line or return fluid line for the work tool, the housing adapted for mounting a reservoir of lubricant;
    the housing defining a first space, a volume of the first space adapted to be varied by adjusting a position of a cap of the housing, and the housing defining a second space fluidly connected in series with the work tool via the at least one drive fluid line or return fluid line;
    a spool disposed at least partially within the first space, the spool adapted to move between a first position and a second position in response to fluid pressure of a drive fluid in the second space; and
    a lubricant pumping mechanism operable by movement of the spool between the first position and the second position to provide a lubricant from the lubricant reservoir to the work tool.

16. The lubrication system of claim 15, wherein the lubricant pumping mechanism comprises a first area and a second area of the spool, the first area adapted to react to a force of the drive fluid and the second area adapted to react to a force of the lubricant.

17. The lubrication system of claim 16, wherein the first area and the second area are related by a ratio of about 1.8 to about 2.2.

18. The lubrication system of claim 15, wherein the lubrication system further includes inlet and outlet connectors for the drive fluid for powering the lubrication system.

19. The lubrication system of claim 15, wherein the lubrication system further includes a check valve connected to an outlet of the lubricant.

20. The lubrication system of claim 15, further including the hydraulic or pneumatic machine selected from a group consisting of a backhoe loader, a skid steer loader and an excavator.

* * * * *

UNITED STATES PATENT AND TRADEMARK OFFICE
CERTIFICATE OF CORRECTION

| | | |
|---|---|---|
| PATENT NO. | : 9,010,493 B2 | Page 1 of 1 |
| APPLICATION NO. | : 13/419386 | |
| DATED | : April 21, 2015 | |
| INVENTOR(S) | : Jagdale et al. | |

It is certified that error appears in the above-identified patent and that said Letters Patent is hereby corrected as shown below:

Claims

Column 9, line 21, In claim 3, after "lubricant is" delete "provided by".

Signed and Sealed this
Twenty-second Day of March, 2016

Michelle K. Lee
*Director of the United States Patent and Trademark Office*